(12) United States Patent
Zha

(10) Patent No.: US 10,901,250 B2
(45) Date of Patent: Jan. 26, 2021

(54) LIQUID CRYSTAL PANEL AND LIQUID CRYSTAL DISPLAY

(71) Applicant: Wuhan China Star Optoelectronics Technology Co., Ltd., Hubei (CN)

(72) Inventor: Guowei Zha, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 351 days.

(21) Appl. No.: 16/068,872

(22) PCT Filed: Apr. 20, 2018

(86) PCT No.: PCT/CN2018/083907
§ 371 (c)(1),
(2) Date: Jul. 9, 2018

(87) PCT Pub. No.: WO2019/148666
PCT Pub. Date: Aug. 8, 2019

(65) Prior Publication Data
US 2020/0355953 A1    Nov. 12, 2020

(30) Foreign Application Priority Data
Jan. 31, 2018 (CN) .......................... 2018 1 0094670

(51) Int. Cl.
*G02F 1/136* (2006.01)
*G02F 1/133* (2006.01)
(Continued)

(52) U.S. Cl.
CPC .... *G02F 1/13318* (2013.01); *G02F 1/133603* (2013.01); *G06K 9/00013* (2013.01);
(Continued)

(58) Field of Classification Search
CPC ............... G02F 1/1368; G02F 1/13338; G02F 1/13318; G09F 9/33; G09F 13/18;
(Continued)

(56) References Cited

U.S. PATENT DOCUMENTS 7,495,713 B2 * 2/2009 Tsai .................... G02F 1/13338
349/12
2008/0036951 A1 2/2008 Tsai et al.
(Continued)

FOREIGN PATENT DOCUMENTS

| CN | 101558369 A | 10/2009 |
|---|---|---|
| CN | 101681036 B | 11/2011 |

(Continued)

*Primary Examiner* — Duc Q Dinh
(74) *Attorney, Agent, or Firm* — Leong C. Lei

(57) ABSTRACT

Disclosed is a liquid crystal panel, comprising a plurality of pixels and a plurality of photodetectors, wherein each pixel comprises a white sub pixel, and an opening area of one white sub pixel partially overlaps with at least one photodetector, which corresponds to the white sub pixel for at least a portion of the white sub pixels, individually. Further disclosed is a liquid crystal display including the liquid crystal panel. The high penetration rate of the white sub pixels is utilized to compensate for the brightness loss caused by the occlusion of the photodetectors, so that the liquid crystal panel can achieve the purpose of even display while having the photodetectors.

20 Claims, 6 Drawing Sheets

(51) Int. Cl.
    *G02F 1/13357* (2006.01)
    *G06K 9/00* (2006.01)
(52) U.S. Cl.
    CPC .............. *G02F 2001/13312* (2013.01); *G02F 2001/133614* (2013.01); *G02F 2201/52* (2013.01)
(58) Field of Classification Search
    CPC ...... G06F 3/041; G06F 3/0482; G06F 3/0412; G06F 3/042; G06F 2203/04109; G06F 3/017; G06F 3/0447; G06F 21/32; G06F 2203/0331; G09G 2320/0233; G09G 2320/029; G09G 2360/142; G09G 2360/148
    USPC .......................................................... 345/102
    See application file for complete search history.

(56) References Cited

U.S. PATENT DOCUMENTS

| | | | |
|---|---|---|---|
| 2010/0295442 A1* | 11/2010 | Harbers | .................. F21K 9/233 |
| | | | 313/501 |
| 2017/0242533 A1* | 8/2017 | Liu | ........................ G06F 3/0416 |
| 2018/0025677 A1* | 1/2018 | Matsui | ................. G09G 3/3607 |
| | | | 345/690 |

FOREIGN PATENT DOCUMENTS

| | | | |
|---|---|---|---|
| CN | 103137023 | A | 6/2013 |
| CN | 103943080 | A | 7/2014 |
| CN | 104007575 | A | 8/2014 |
| CN | 106128405 | A | 11/2016 |
| CN | 106653770 | A | 5/2017 |
| KR | 10-2008-0020860 | A | 3/2008 |

* cited by examiner

LIQUID CRYSTAL PANEL AND LIQUID CRYSTAL DISPLAY

RELATED APPLICATIONS

The present application is a National Phase of International Application Number PCT/CN2018/083907, filed Apr. 20, 2018, and claims the priority of China Application No. 201810094670.2, filed Jan. 31, 2018.

FIELD OF THE INVENTION

The present invention relates to a liquid crystal display field, and more particularly to a liquid crystal panel and a liquid crystal display.

BACKGROUND OF THE INVENTION

In a modern society, the interaction between people and displays has become an important way for people to acquire and share information. The liquid crystal displays have become the mainstream of current displays due to good picture reproducibility because liquid crystal displays have gradually satisfied the human eye's visual requirements for display quality as regarding resolution, frame rate, color gamut, color deviation, contrast, viewing angle, crosstalk and flicker.

The latest breakthrough direction of mobile terminal display technology in recent years is to pay more attention to the integration of new interactive technologies and the improvement of visual aesthetics. One of the important directions is the comprehensive screen display technology with a higher screen duty ratio. The key breakthrough are the compression of the upper, lower, left and right borders of the display panel, the special cuttings of cameras and detectors and the in-panel fingerprint identification. At present, the more commonly used method is to utilize the positive fingerprint identification technology. The traditional fingerprint identification technology adopts an integrated solution with the Home key but the requirement of full screen technology makes the in-panel fingerprint identification become the current top priority. At present, there are three main solutions of fingerprint identification technology: capacitive fingerprint identification, ultrasonic fingerprint identification and optical fingerprint identification. The optical fingerprint identification is the one closest to the mass production because of the capability of penetrating the thicker cover glass.

The application of the optical fingerprint identification in the liquid crystal display technology has become the focus of current research breakthrough. Nevertheless, one significant difficulty is that the in-panel identification area of the liquid crystal display needs photodetectors to be configured. Inevitably, it will affect the penetration rate and gray level brightness of the in-panel identification area, resulting in uneven display of the entire LCD monitor. In addition, in condition of no major breakthrough in battery technology, the power consumption of mobile terminals is still an important consideration for the liquid crystal displays. Therefore, there is an urgent need to address the balance between in-panel fingerprint identification and power consumption.

SUMMARY OF THE INVENTION

For solving the technical problems existing in the prior art described above, an objective of the present invention is to provide a liquid crystal panel and a liquid crystal display achieving even display even with photodetectors.

First, the present invention provides a liquid crystal panel, comprising a plurality of pixels and a plurality of photodetectors, wherein each pixel comprises a white sub pixel, and an opening area of one white sub pixel partially overlaps with at least one photodetector, which corresponds to the white sub pixel for at least a portion of the white sub pixels, individually.

Furthermore, an opening area of each white sub pixel partially overlaps with at least one photodetector, which corresponds to the white sub pixel in an upper half of the liquid crystal panel; or an opening area of each white sub pixel partially overlaps with at least one photodetector, which corresponds to the white sub pixel in a lower half of the liquid crystal panel.

Furthermore, each pixel further comprises a red sub pixel, a green sub pixel and a blue sub pixel.

Furthermore, in the pixel, of which the opening area of the white sub pixel partially overlaps with at least one photodetector, which corresponds to the white sub pixel, a pixel size of the white sub pixel is smaller than a pixel size of the red sub pixel and a pixel size of the green sub pixel, respectively, and a pixel size of the blue sub pixel is smaller than the pixel size of the red sub pixel and the pixel size of the green sub pixel, respectively.

Furthermore, a pixel size of the white sub pixel is the same as a pixel size of the blue sub pixel.

Furthermore, a pixel size of the red sub pixel is the same as a pixel size of the green sub pixel.

Furthermore, the photodetector comprises a fingerprint identification photodetector.

Meanwhile, the present invention further provides a liquid crystal display, comprising the aforesaid liquid crystal panel; a backlight module, arranged opposite to the liquid crystal panel.

Furthermore, the backlight module comprises light emitting diodes, and the light emitting diodes comprise blue light emitting diode chips and yellow phosphor powder.

Furthermore, the backlight module comprises light emitting diodes, and the light emitting diodes comprise blue light emitting diode chips and red green phosphor powder.

The benefits of the present invention are; the high penetration rate of the white sub pixels is utilized to compensate for the brightness loss caused by the occlusion of the photodetectors, so that the liquid crystal panel can achieve the purpose of even display while having the photodetectors.

BRIEF DESCRIPTION OF THE DRAWINGS

The above features and advantages of the embodiments of the present invention will become more apparent from the following description taken in conjunction with the accompanying drawings in which.

DETAILED DESCRIPTION OF PREFERRED EMBODIMENTS

Figure 1:
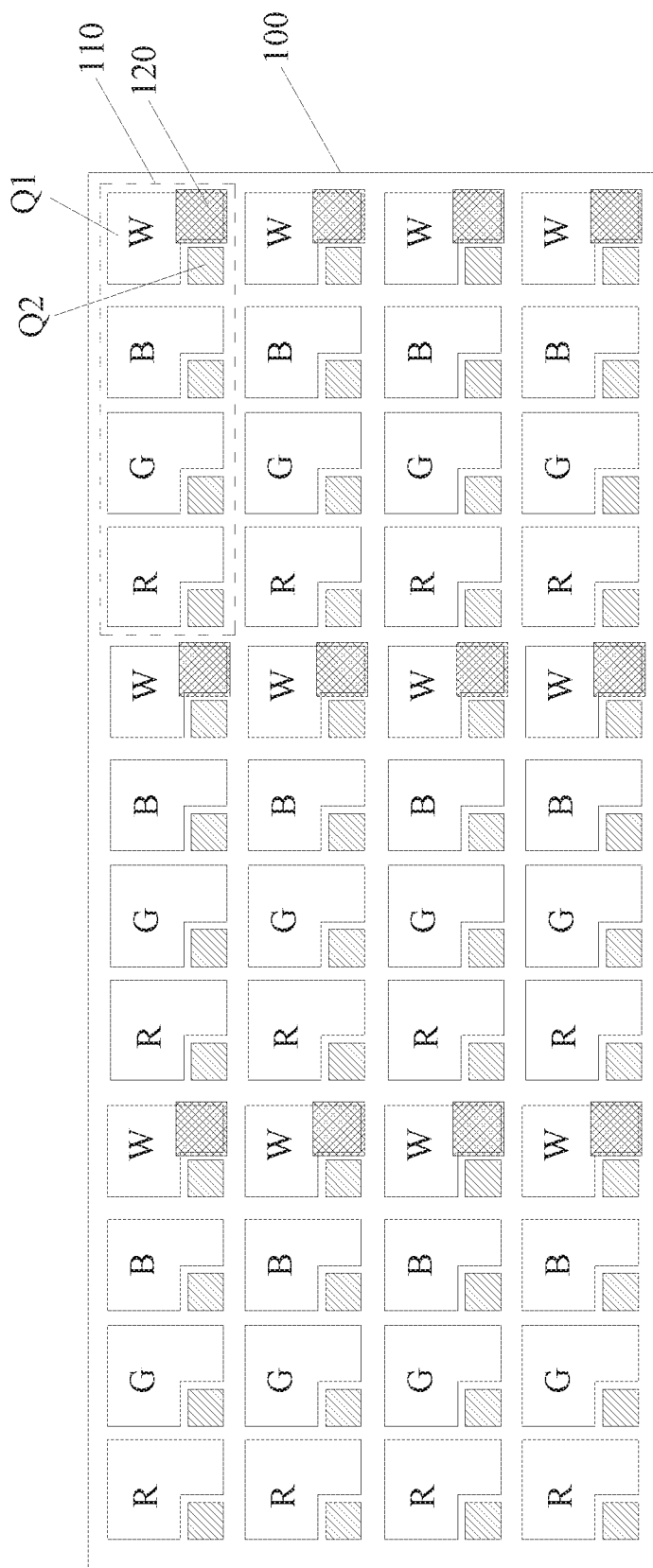
FIG. 1 is a structure diagram of a liquid crystal panel according to the embodiment of the present invention.

Hereinafter; the embodiments of the present invention will be described in detail with reference to the accompanying drawings. However, the present invention may be embodied in various different forms and should not be construed as limited to the specific embodiments set forth herein. Rather, these embodiments are provided to explain the principles of the present invention and the practical application thereof to thereby enable those of ordinary skill in the art to understand the various embodiments of the present invention and the various adaptations for the specific intended application.

In the figures, the thickness of layers and areas are exaggerated for clarity. The same reference numerals denote the same components throughout the specification and the figures.

It is understood that the terminologies "first" and "second" here are used to describe various elements, and these elements should not be limited by these terms. These terms are only used to distinguish one element from another element.

FIG. 1 is a structure diagram of a liquid crystal panel according to the embodiment of the present invention.

Please refer to FIG. 1. The liquid crystal panel 100 according to the embodiment of the present invention comprises a plurality of pixels 110 and a plurality of photodetectors 120.

Specifically, the plurality of pixels 110 are aligned in an array. In this embodiment, each pixel 110 comprises a red sub pixel R, a green sub pixel G, a blue sub pixel B and a white sub pixel W. Each sub pixel generally comprises an opening area Q1 and an element area Q2; wherein the opening area Q1 generally allows back light provided by the backlight module to pass through, and the element area Q2 cannot allow the back light provided by the backlight module to pass through because a thin film transistor and the like are disposed in the element area Q2.

Furthermore, in this embodiment, the photodetectors 120 correspond to the white sub pixels W one by one. One photodetector 120 partially overlaps with an opening area Q1 of one white sub pixel W corresponding thereto. Then, the photodetector 120 will influence the penetration rate of the opening area Q1 of the white sub pixel W, which is partially overlapped therewith to reduce the penetration rate of the opening area Q1 of the white sub pixel W. However, since the white sub pixel W itself has the high penetration rate, the high penetration rate of the white sub pixel W is utilized to compensate for the brightness loss caused by the occlusion of the photodetector 120.

Figure 5:
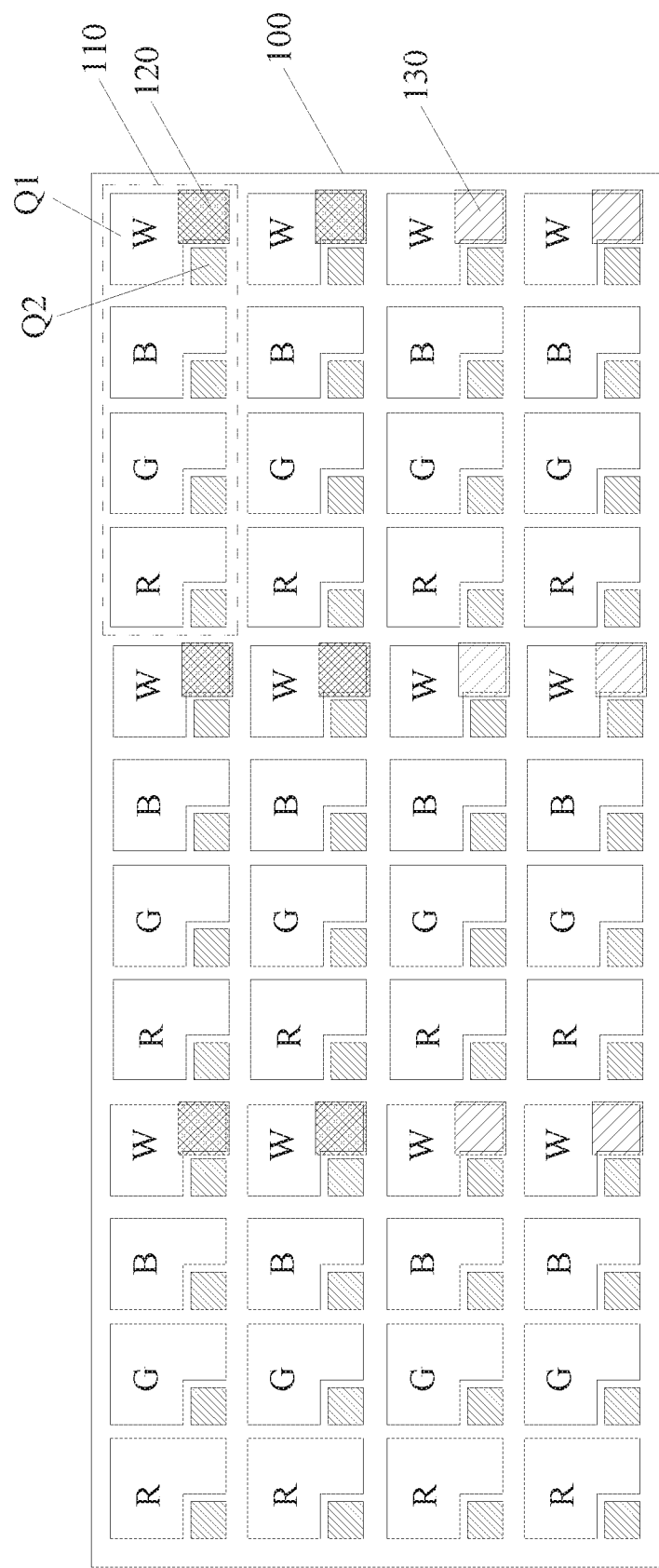
FIG. 5 is a structure diagram of a liquid crystal panel according to another embodiment of the present invention.

As other embodiments of the present invention, it is not required that each white sub pixel W corresponds to one photodetector 120, and it may also be an option that one white sub pixels W corresponds to one photodetector for a portion of the white sub pixels, individually. As shown in FIG. 5, each white sub pixel W of the pixel 110 in an upper half of the liquid crystal panel 100 corresponds to one photodetector 120, and an opening area Q1 of each white sub pixel W of the pixel 110 partially overlaps with at least one photodetector 120, which corresponds to the white sub pixel W in an upper half of the liquid crystal panel 100. In addition, in order to keep the uniform overall display of the liquid crystal panel 100, each white sub pixel W of the pixel 110 in a lower half of the liquid crystal panel 100 can correspond to one light shielding unit 130. Then, the white sub pixels W of the pixels 110 in the upper half of the liquid crystal panel 100 and the white sub pixels W in the pixels 110 in the lower half of the liquid crystal panel 100 have the same display brightness.

Figure 6:
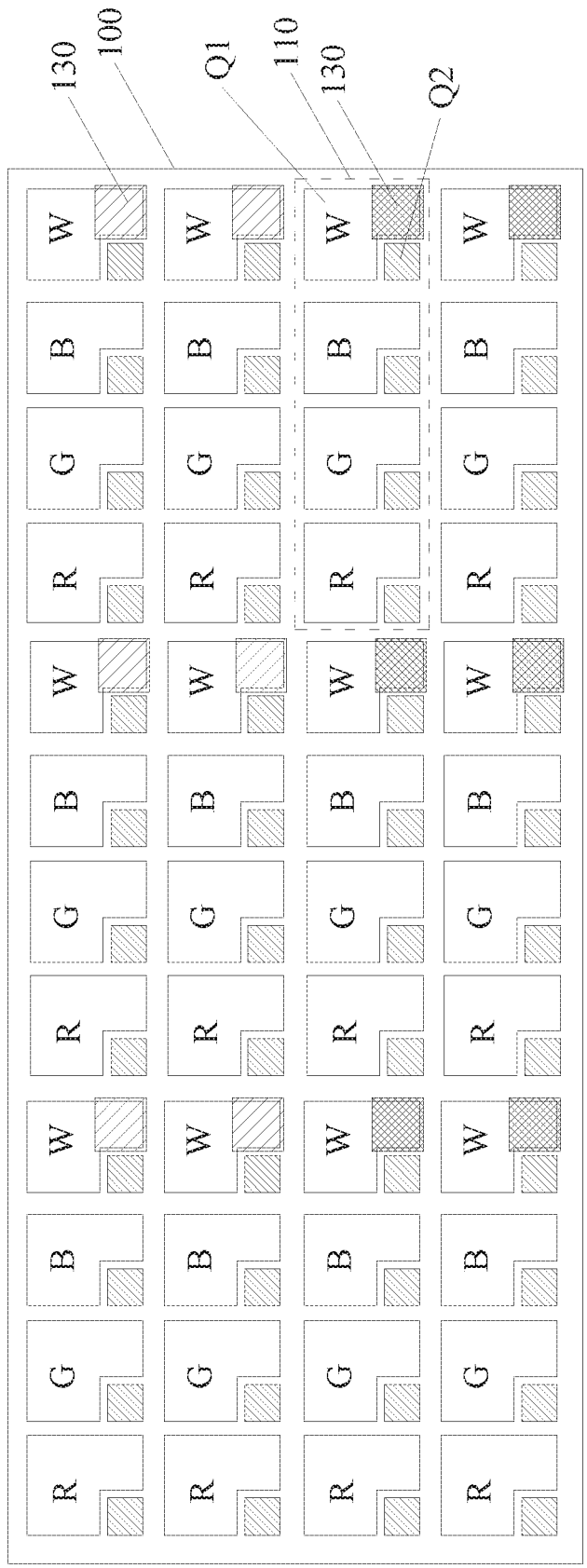
FIG. 6 is a structure diagram of a liquid crystal panel according to one another embodiment of the present invention.

Alternatively, as shown in FIG. 6, each white sub pixel W of the pixel 110 in a lower half of the liquid crystal panel 100 corresponds to one photodetector 120, and an opening area Q1 of each white sub pixel W of the pixel 110 partially overlaps with at least one photodetector 120, which corresponds to the white sub pixel W in a lower half of the liquid crystal panel 100. In addition, in order to keep the uniform overall display of the liquid crystal panel 100, each white sub pixel W of the pixel 110 in an upper half of the liquid crystal panel 100 can correspond to one light shielding unit 130. Then, the white sub pixels W of the pixels 110 in the upper half of the liquid crystal panel 100 and the white sub pixels W in the pixels 110 in the lower half of the liquid crystal panel 100 have the same display brightness.

Figure 7:
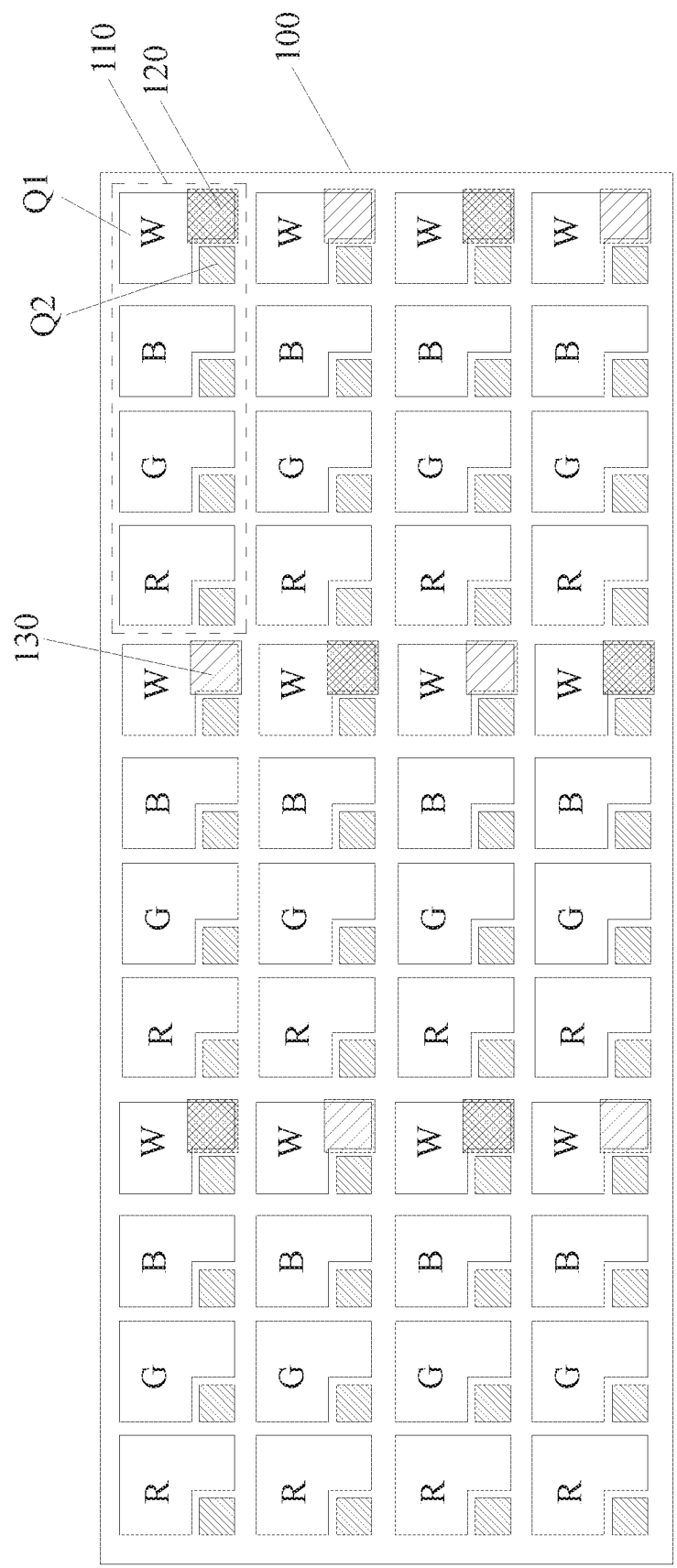
FIG. 7 is a structure diagram of a liquid crystal panel according to one another embodiment of the present invention.

Alternatively, the pixels 110, of which the opening area Q1 of the white sub pixel W partially overlaps with at least one photodetector 120 which corresponds thereto, are evenly distributed in all the pixels 110 of the liquid crystal panel 100. For instance as shown in FIG. 7, one photodetector 120 is arranged in every other pixel 110 in the horizontal direction, and one photodetector 120 is arranged in every other pixel 110 in the vertical direction. Namely, the opening areas Q1 of the white sub pixels of the pixel 110 around the pixel 110, of which the opening area Q1 of the white sub pixel W corresponds to one photodetector 120, do not correspond to the photodetectors 120 but correspond to the light shielding units 30.

Certainly, it should be understood that the arrangement of the photodetectors 120 in the liquid crystal panel 100 can have other possible options according to the actual needs. The present invention is not limited to the aforementioned arrangement of the photodetectors 120.

Accordingly, the high penetration rate of the white sub pixels W is utilized to compensate for the brightness loss caused by the occlusion of the photodetectors 120, so that the liquid crystal panel can achieve the purpose of even display while having the photodetectors.

As another embodiment of the present invention, each white sub pixel W also can correspond to two photodetectors 120. Then, the opening area Q1 of one white sub pixel W partially overlaps with the two photodetectors 120, which correspond to the white sub pixel for each white sub pixel, individually. Certainly, it should be understood that each white sub pixel W may correspond to three or more photodetectors 120 according to actual needs.

In general, the liquid crystal panel 100 comprises an array substrate (not shown) and a color filter substrate (not shown). In the embodiment of the present invention, the photodetectors 120 may be disposed on the array substrate, or may also be disposed on the color filter substrate as long as that the photodetector 120 partially overlaps with the opening area Q1 of the white sub pixel W corresponding thereto in space, namely, as long as a projection of the photodetector 120 on the white sub pixel W falls inside the opening area Q1 of the white sub pixel W corresponding thereto.

In addition, still referring to FIG. 1, in this embodiment, each pixel 110 is shown to comprise a red sub pixel R, a green sub pixel G, a blue sub pixel B and a white sub pixel W from left to right. However, the present invention is not limited thereto. The arrangement of the red sub pixel R, the green sub pixel G, the blue sub pixel B and the white sub pixel W in each pixel 110 can be arbitrarily changed according to the actual needs. For instance for another embodiment of the present invention, the red sub pixel R, the green sub pixel G, the blue sub pixel B and the white sub pixel W can be arranged to form the pixel 110. Alternatively, the red sub pixel R, the green sub pixel G, the blue sub pixel B and the white sub pixel W are aligned from top to bottom in sequence to form the pixel 110.

In order to avoid the problem of unbalanced brightness and pure color deviation caused by the traditional RGBW technology and to consider the simplification for the driving application, in this embodiment, a pixel size of the white sub pixel W is smaller than a pixel size of the red sub pixel R and a pixel size of the green sub pixel G, respectively, and a pixel size of the blue sub pixel B is smaller than the pixel size of the red sub pixel R and the pixel size of the green sub pixel G, respectively. Here, the pixel size of the sub pixel refers to a pixel area of the sub pixel or refers to an area of an opening area of the sub pixel.

Furthermore, a pixel size of the red sub pixel R is the same as a pixel size of the green sub pixel G. Besides, a pixel size of the white sub pixel W is the same as a pixel size of the blue sub pixel B. Thus, the white sub pixel W adopts smaller opening area, which can well balance the brightness compensation and can solve the problem of pure color deviation, and meanwhile, is beneficial for expanding the aperture ratios of the red sub pixel R and the green sub pixel G.

In addition, in this embodiment, the photodetector 120 comprises a fingerprint identification photodetector. However, the present invention is not limited thereto. Thus, the in-panel identification area A1 is used to form a fingerprint identification area.

As well known, the liquid crystal panel 100 does not emit light, so the display must be conducted by using the back light provided by the backlight module, which is opposed thereto. Therefore, the embodiment further provides a backlight module.

Figure 2:
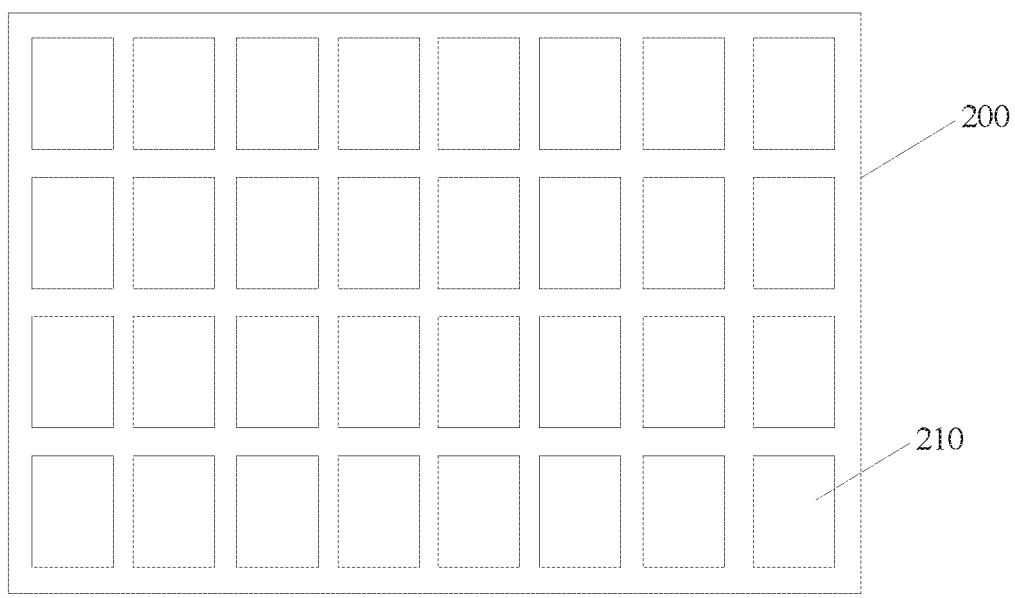
FIG. 2 is a structure diagram of a backlight module according to the embodiment of the present invention.

FIG. 2 is a structure diagram of a backlight module according to the embodiment of the present invention.

Please refer to FIG. 2. The backlight module 200 according to the embodiment of the present invention can be arranged opposite to the liquid crystal panel 100 shown in FIG. 1 to provide a back light for the liquid crystal panel 100. The backlight module 200 comprises a plurality of light emitting diodes (LEDs) 210. The plurality of LEDs 210 is arranged in an array. The backlight module 200 is thus configured as a direct type backlight module. As another embodiment of the present invention, the backlight module 200 may also be a side type backlight module.

Figure 3:
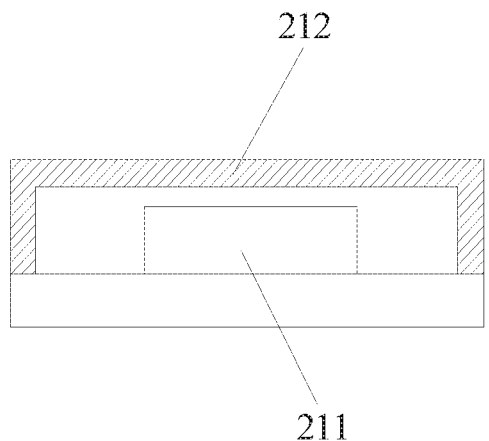
FIG. 3 is a structure diagram of a light emitting diode according to the embodiment of the present invention.

In this embodiment, as shown in FIG. 3, the LED 210 can comprise a blue LED chip 211 and yellow phosphor powder 212. However, the present invention is not limited thereto. The difference from the conventional composition of the blue LED chip 211 and yellow phosphor powder is that a content of yellow phosphor in the LED 210 of this embodiment is lower than a content of yellow phosphor in the conventional LED. Then, the amount of blue light emitted by the LED 210 can be increased to compensate for the color deviation caused by the unbalanced aperture ratio of the red sub pixel R, the green sub pixel G and the blue sub pixel B.

Figure 4:
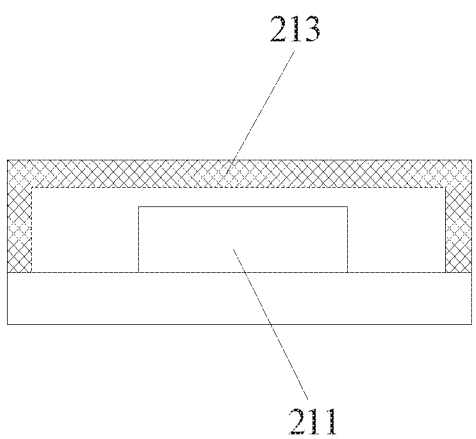
FIG. 4 is a structure diagram of a light emitting diode according to another embodiment of the present invention.

In addition, as another embodiment of the present invention shown in FIG. 4, the LED 210 can comprise a blue LED chip 211 and red green phosphor powder 213 for an illustration. However, the present invention is not limited thereto.

In conclusion, according to the embodiment of the present invention, the high penetration rate of the white sub pixels is utilized to compensate for the brightness loss caused by the occlusion of the photodetectors, so that the liquid crystal panel can achieve the purpose of even display while having the photodetectors.

Although the above preferred embodiments of the present invention are disclosed, the foregoing preferred embodiments are not intended to limit the invention; those skilled in the art can make various kinds of alterations and modifications without departing from the spirit and scope of the present invention. Thus, the scope of protection of the present invention is defined by the scope of the claims.

What is claimed is:

1. A liquid crystal panel, comprising a plurality of pixels and a plurality of photodetectors, wherein each pixel comprises a white sub pixel, and an opening area of one white sub pixel partially overlaps with at least one photodetector, which corresponds to the white sub pixel for at least a portion of the white sub pixels, individually, and for rest white sub pixels except the aforesaid portion of the white sub pixels, an opening area of one white sub pixel partially overlaps with at least one light shielding unit, such that the aforesaid portion of the white sub pixels and the rest white sub pixels have a same display brightness to keep uniform overall display of the liquid crystal panel.

2. The liquid crystal panel according to claim 1, wherein an opening area of each white sub pixel partially overlaps with at least one photodetector, which corresponds to the white sub pixel in an upper half of the liquid crystal panel; or an opening area of each white sub pixel partially overlaps with at least one photodetector, which corresponds to the white sub pixel in a lower half of the liquid crystal panel.

3. The liquid crystal panel according to claim 1, wherein each pixel further comprises a red sub pixel, a green sub pixel and a blue sub pixel.

4. The liquid crystal panel according to claim 2, wherein each pixel further comprises a red sub pixel, a green sub pixel and a blue sub pixel.

5. The liquid crystal panel according to claim 3, wherein in the pixel, of which the opening area of the white sub pixel partially overlaps with at least one photodetector, which corresponds to the white sub pixel, a pixel size of the white sub pixel is smaller than a pixel size of the red sub pixel and a pixel size of the green sub pixel, respectively, and a pixel size of the blue sub pixel is smaller than the pixel size of the red sub pixel and the pixel size of the green sub pixel, respectively.

6. The liquid crystal panel according to claim 4, wherein in the pixel, of which the opening area of the white sub pixel partially overlaps with at least one photodetector, which corresponds to the white sub pixel, a pixel size of the white sub pixel is smaller than a pixel size of the red sub pixel and a pixel size of the green sub pixel, respectively, and a pixel size of the blue sub pixel is smaller than the pixel size of the red sub pixel and the pixel size of the green sub pixel, respectively.

7. The liquid crystal panel according to claim 3, wherein a pixel size of the white sub pixel is the same as a pixel size of the blue sub pixel.

8. The liquid crystal panel according to claim 4, wherein a pixel size of the white sub pixel is the same as a pixel size of the blue sub pixel.

9. The liquid crystal panel according to claim 3, wherein a pixel size of the red sub pixel is the same as a pixel size of the green sub pixel.

10. The liquid crystal panel according to claim 4, wherein a pixel size of the red sub pixel is the same as a pixel size of the green sub pixel.

11. The liquid crystal panel according to claim 1, wherein the photodetector comprises a fingerprint identification photodetector.

12. A liquid crystal display, comprising:
a liquid crystal panel, wherein the liquid crystal panel comprises a plurality of pixels and a plurality of photodetectors, wherein each pixel comprises a white sub pixel, and an opening area of one white sub pixel partially overlaps with at least one photodetector, which corresponds to the white sub pixel for at least a portion of the white sub pixels, individually, and for rest white sub pixels except the aforesaid portion of the white sub pixels, an opening area of one white sub pixel partially overlaps with at least one light shielding unit, such that the aforesaid portion of the white sub pixels and the rest white sub pixels have a same display brightness to keep uniform overall display of the liquid crystal panel;
a backlight module, arranged opposite to the liquid crystal panel.

13. The liquid crystal display according to claim 12, wherein an opening area of each white sub pixel partially overlaps with at least one photodetector, which corresponds to the white sub pixel in an upper half of the liquid crystal panel; or an opening area of each white sub pixel partially overlaps with at least one photodetector, which corresponds to the white sub pixel in a lower half of the liquid crystal panel.

14. The liquid crystal display according to claim 12, wherein each pixel further comprises a red sub pixel, a green sub pixel and a blue sub pixel, and in the pixel, of which the opening area of the white sub pixel partially overlaps with at least one photodetector, which corresponds to the white sub pixel, a pixel size of the white sub pixel is smaller than a pixel size of the red sub pixel and a pixel size of the green sub pixel, respectively, and a pixel size of the blue sub pixel is smaller than the pixel size of the red sub pixel and the pixel size of the green sub pixel, respectively.

15. The liquid crystal display according to claim 13, wherein each pixel further comprises a red sub pixel, a green sub pixel and a blue sub pixel, and in the pixel, of which the opening area of the white sub pixel partially overlaps with at least one photodetector, which corresponds to the white sub pixel, a pixel size of the white sub pixel is smaller than a pixel size of the red sub pixel and a pixel size of the green sub pixel, respectively, and a pixel size of the blue sub pixel is smaller than the pixel size of the red sub pixel and the pixel size of the green sub pixel, respectively.

16. The liquid crystal display according to claim 14, wherein a pixel size of the white sub pixel is the same as a pixel size of the blue sub pixel, and/or a pixel size of the red sub pixel is the same as a pixel size of the green sub pixel.

17. The liquid crystal display according to claim 15, wherein a pixel size of the white sub pixel is the same as a pixel size of the blue sub pixel, and/or a pixel size of the red sub pixel is the same as a pixel size of the green sub pixel.

18. The liquid crystal display according to claim 12, wherein the photodetector comprises a fingerprint identification photodetector.

19. The liquid crystal display according to claim 12, wherein the backlight module comprises light emitting diodes, and the light emitting diodes comprise blue light emitting diode chips and yellow phosphor powder.

20. The liquid crystal display according to claim 12, wherein the backlight module comprises light emitting diodes, and the light emitting diodes comprise blue light emitting diode chips and red green phosphor powder.

* * * * *